(12) United States Patent
Salzman (10) Patent No.: US 8,827,038 B2
(45) Date of Patent: Sep. 9, 2014

(54) LADDER ASSEMBLY FOR A WORK VEHICLE

(71) Applicant: CNH America LLC, New Holland, PA (US)

(72) Inventor: Eran Salzman, Skokie, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/712,106

(22) Filed: Dec. 12, 2012

(65) Prior Publication Data

US 2014/0158465 A1    Jun. 12, 2014

(51) Int. Cl.
*E06C 5/22* (2006.01)
*E06C 5/02* (2006.01)

(52) U.S. Cl.
CPC .... *E06C 5/22* (2013.01); *E06C 5/02* (2013.01)
USPC .................. 182/127; 182/93; 182/97; 182/98

(58) Field of Classification Search
USPC ..................... 182/82, 93, 95, 96, 97, 98, 127; 114/362
See application file for complete search history.

(56) References Cited

U.S. PATENT DOCUMENTS

| | | | | |
|---|---|---|---|---|
| 2,622,783 | A * | 12/1952 | Mahoney | 182/89 |
| 2,743,861 | A * | 5/1956 | Mattis et al. | 182/95 |
| 3,190,392 | A | 6/1965 | Ashton et al. | |
| 3,311,183 | A | 3/1967 | Phillips | |
| 3,601,220 | A * | 8/1971 | Saucier | 182/84 |
| 3,869,022 | A | 3/1975 | Wallk | |
| 3,949,889 | A | 4/1976 | Moe | |
| 3,997,183 | A * | 12/1976 | Russey | 280/166 |
| 4,293,967 | A * | 10/1981 | Ord | 114/362 |
| 4,480,845 | A | 11/1984 | Hansen | |
| 4,848,517 | A * | 7/1989 | Broyles, III | 182/83 |
| 5,123,372 | A * | 6/1992 | Kobayashi et al. | 114/362 |
| 6,012,545 | A * | 1/2000 | Faleide | 182/97 |
| 6,179,312 | B1 * | 1/2001 | Paschke et al. | 280/166 |
| 6,739,349 | B2 * | 5/2004 | Kastenschmidt et al. | 137/15.16 |
| 7,017,709 | B1 | 3/2006 | Laymance | |

(Continued)

FOREIGN PATENT DOCUMENTS

| | | |
|---|---|---|
| DE | 3501390 A1 | 8/1985 |
| FR | 2595999 A1 | 9/1987 |
| JP | 7259463 A | 10/1995 |
| JP | 2001211726 A | 8/2001 |

OTHER PUBLICATIONS

Prior Art Photos 1, 2, 3, 4, 5, 6, 7, 8, and 9.

*Primary Examiner* — Alvin Chin-Shue
*Assistant Examiner* — Colleen M Chavchavadze
(74) *Attorney, Agent, or Firm* — Sue C. Watson (57) ABSTRACT

A ladder assembly for a work vehicle is disclosed. The ladder assembly may generally include a ladder having a first side rail, a second side rail and first and second rungs extending between the first and second side rails. The ladder may be supported on the work vehicle at a first pivot point and a second pivot point. The ladder may also include a first linkage and a second linkage. The first linkage may be coupled between the first rung and the first pivot point and the second linkage may be coupled between the second rung and the second pivot point. In addition, the ladder may be configured to pivot about the first and second pivot points between a first position and a second position.

19 Claims, 5 Drawing Sheets

(56) References Cited

U.S. PATENT DOCUMENTS

| | | | |
|---|---|---|---|
| 7,137,479 B2 * | 11/2006 | Ziaylek et al. | 182/127 |
| 7,607,400 B2 * | 10/2009 | Scotti | 114/362 |
| 7,686,133 B2 | 3/2010 | Caudill | |
| 8,074,768 B2 * | 12/2011 | Rund | 182/86 |
| 8,186,763 B2 | 5/2012 | Kramer et al. | |

* cited by examiner

LADDER ASSEMBLY FOR A WORK VEHICLE

FIELD OF THE INVENTION

The present subject matter relates generally to work vehicles and, more particularly, to a ladder assembly for a work vehicle.

BACKGROUND OF THE INVENTION

Typically, a large work vehicle, such as a tractor or a combine, includes a service ladder that provides the vehicle operator access from the ground to upper portions of the vehicle. For example, service ladders for work vehicles may be often used to access a service platform located on the side of the cab. As such, the vehicle operator may climb up the service ladder and onto the service platform to perform various service/maintenance operations, such as cleaning the cab's windshield, adjusting the position of mirrors/lights and/or performing any other suitable service/maintenance operations.

Most conventional service ladders are fixedly coupled to the portion of the vehicle's fuel tank that extends along the side of the work vehicle between the front and rear wheels. However, to allow for the vehicle operator to step-up onto the bottom rung of such service ladders, the bottom rung must be positioned well below the bottom of the fuel tank. As such, the bottom portion of the ladder typically extends beyond the lowest portion of the work vehicle, which may result in the ladder contacting and/or damaging crops and/or other objects passing under the vehicle during operation. In addition, for service ladders fixedly coupled to the fuel tank, the ladder must be spaced apart from the fuel tank to allow the vehicle operator sufficient toe clearance to utilize the ladder, thereby increasing the likelihood of the ladder contacting and/or damaging crops and/or other objects passing along the side of the work vehicle during operation.

To avoid at least one of the issues described above, some work vehicles include service ladders molded directly into the fuel tank. For example, fuel tanks are known that include large cavities molded into the side of the tank along a vertical column, with each cavity defining a step of the service ladder. However, such molded features significantly reduce the fuel capacity of the fuel tank.

Accordingly, a ladder assembly for a work vehicle that addresses one, some or all of the issues described above with respect to conventional service ladders would be welcomed in the technology

BRIEF DESCRIPTION OF THE INVENTION

Aspects and advantages of the invention will be set forth in part in the following description, or may be obvious from the description, or may be learned through practice of the invention.

In one aspect, the present subject matter is directed to a ladder assembly for a work vehicle. The ladder assembly may generally include a ladder having a first side rail, a second side rail and first and second rungs extending between the first and second side rails. The ladder may be supported on the work vehicle at a first pivot point and a second pivot point. The ladder may also include a first linkage and a second linkage. The first linkage may be coupled between the first rung and the first pivot point and the second linkage may be coupled between the second rung and the second pivot point. In addition, the ladder may be configured to pivot about the first and second pivot points between a first position and a second position.

In another aspect, the present subject matter is directed to a work vehicle including a fuel tank and a ladder assembly pivotally supported relative to the fuel tank. The ladder assembly may generally include a ladder having a first side rail, a second side rail and first and second rungs extending between the first and second side rails. The ladder may be supported on the work vehicle at a first pivot point and a second pivot point. The ladder may also include a first linkage and a second linkage. The first linkage may be coupled between the first rung and the first pivot point and the second linkage may be coupled between the second rung and the second pivot point. In addition, the ladder may be configured to pivot about the first and second pivot points between a first position and a second position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a ladder assembly for use in accessing portions of a work vehicle that are elevated from the ground, such as am elevated service platform of the vehicle. In several embodiments, the ladder assembly may include a ladder pivotally supported on the work vehicle about a first pivot point and a second pivot point. As such, the entire ladder may be rotated or pivoted as a single unit between a first, raised position, wherein the ladder is positioned directly adjacent to a component of the work vehicle (e.g., a fuel tank of the work vehicle) and a second, lowered position, wherein the ladder is pivoted downward and outwardly relative to the component. As such, when the ladder is not in use, the ladder may be moved to the raised position against the vehicle component. However, when the ladder is in use, the ladder may be moved to the lowered position such that the vehicle operator may easily access and utilizes the ladder.

Figure 1:
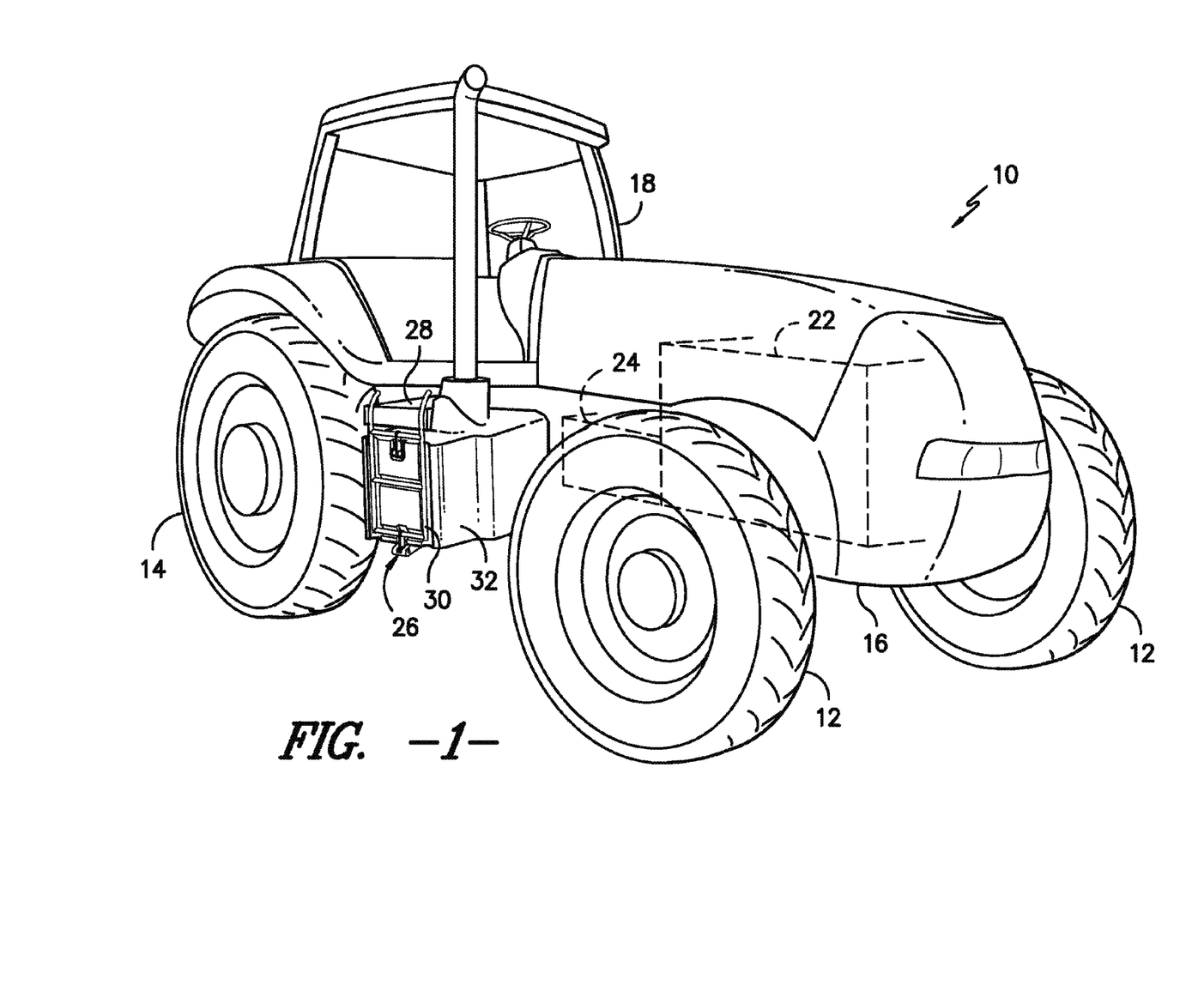
FIG. 1 illustrates a perspective view of one embodiment of a work vehicle, particularly illustrating one embodiment of a ladder assembly of the work vehicle.

Referring now to the drawings, FIG. 1 illustrates a perspective view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles (e.g., combines), earth-moving vehicles, road vehicles, loaders and/or the like.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control devices (not shown) for permitting an operator to control the operation of the work vehicle 10. Additionally, the work vehicle 10 may include an engine 22 and a transmission 24 mounted on the chassis 16. The transmission 24 may be operably coupled to the engine 22 and may provide variably adjusted gear ratios for transferring engine power to the wheels 14 via a differential (not shown).

In addition, the work vehicle 10 may also include a ladder assembly 26 for providing access to the upper, elevated portions of the vehicle 10. For example, in one embodiment, the ladder assembly 26 may be configured to provide access to an elevated service platform 28 extending adjacent to a bottom portion of the cab 18. The service platform may generally be positioned on the work vehicle 10 so as to allow the operator to perform various service/maintenance operations on the elevated portions of the work vehicle 10, such as the upper portion of the cab 18. For example, when standing on the service platform 28, the operator may be able to clean the windshield of the cab 18, adjust the orientation of any mirrors and/or lights located on or adjacent to the cab 18, access modules located on the roof of the cab 18 and/or perform any other suitable service/maintenance operations on and/or around the cab 18.

In several embodiments, the ladder assembly 26 may include a ladder 30 configured to be vertically supported along a portion of the work vehicle 10. For example, as shown in FIG. 1, the ladder 30 may be vertically supported adjacent to a fuel tank 32 positioned on the side of the work vehicle 10. However, it should be appreciated that, in alternative embodiments, the ladder 30 may be positioned at any other suitable location on the work vehicle 10 and, thus, may be configured to extend adjacent to any other suitable component of the work vehicle 10.

Figure 2:
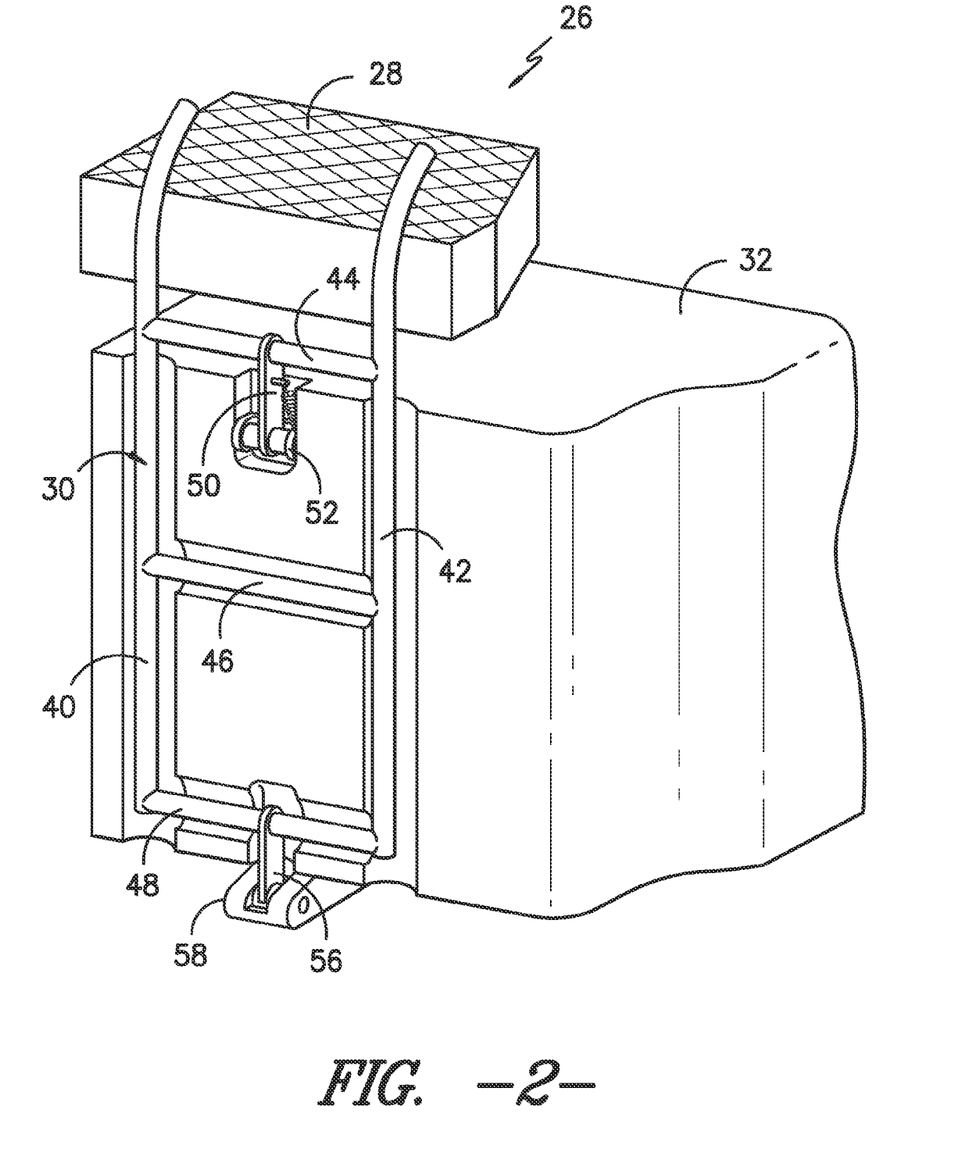
FIG. 2 illustrates a close-up, perspective view of the ladder assembly shown in FIG. 1, particularly illustrating a ladder of the ladder assembly in a first, raised position.
Figure 3:
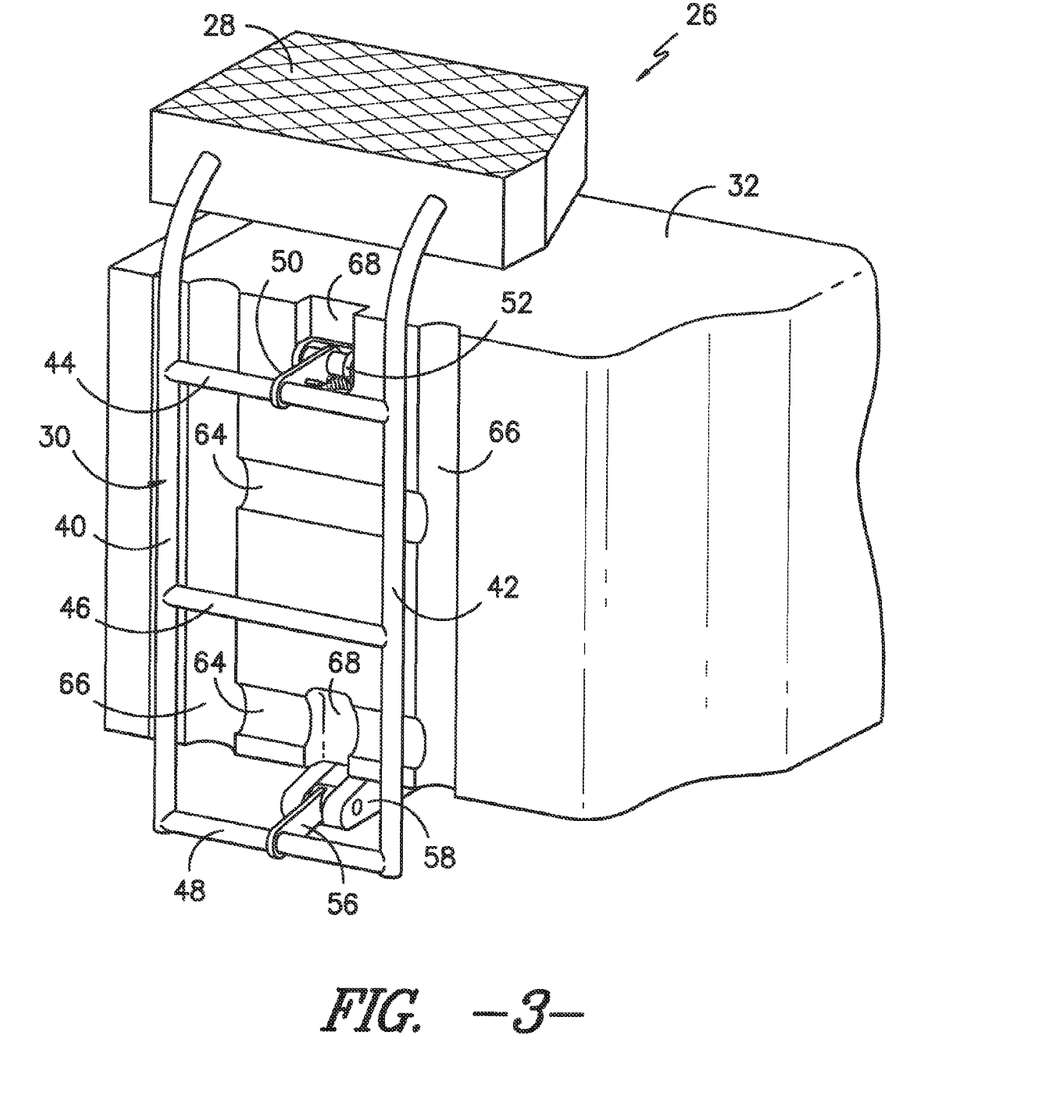
FIG. 3 illustrates another close-up, perspective view of the ladder assembly shown in FIG. 1, particularly illustrating the ladder of the ladder assembly in a second, lowered position.
Figure 4:
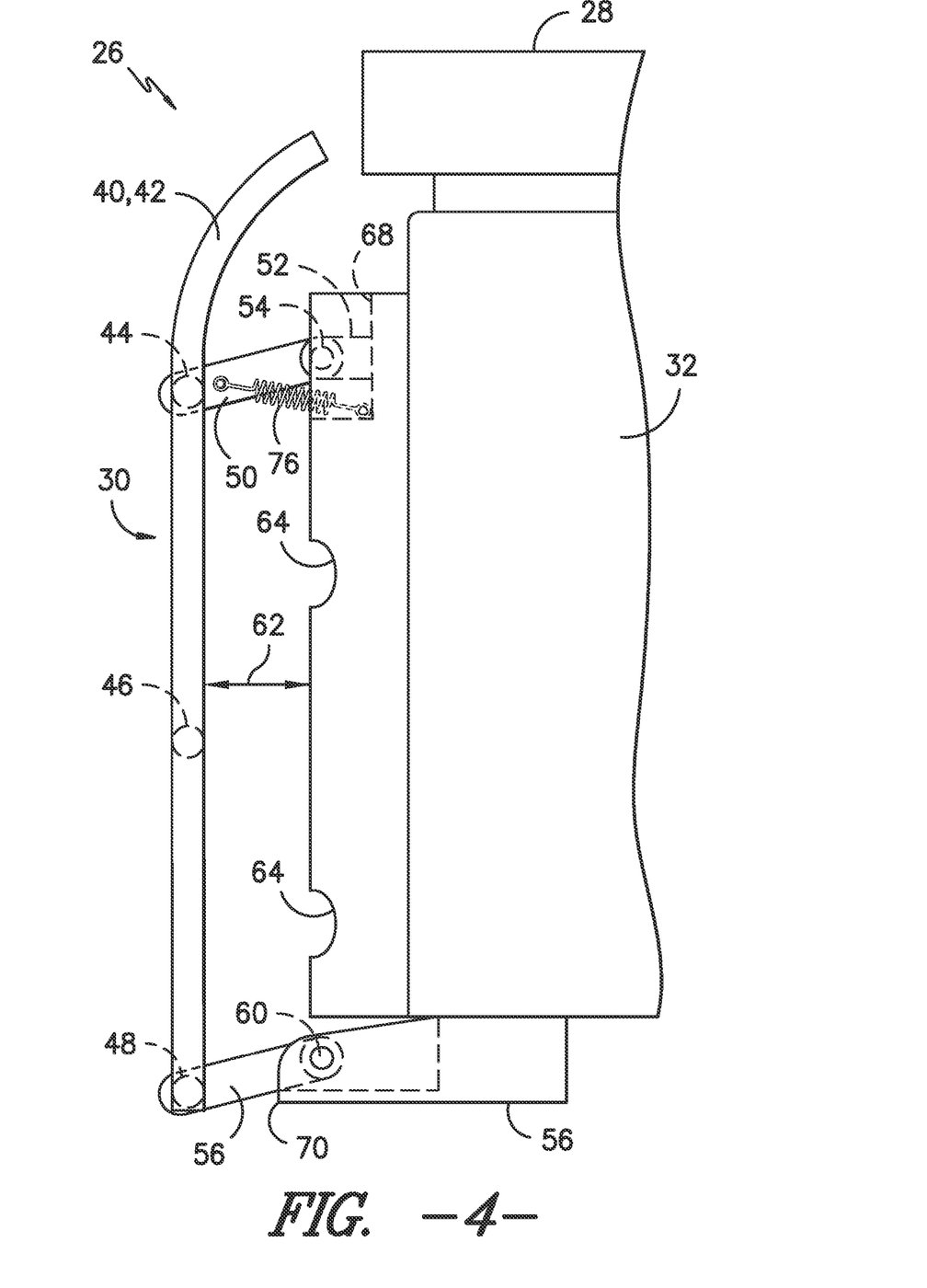
FIG. 4 illustrates a side view of the ladder assembly shown in FIG. 3.
Figure 5:
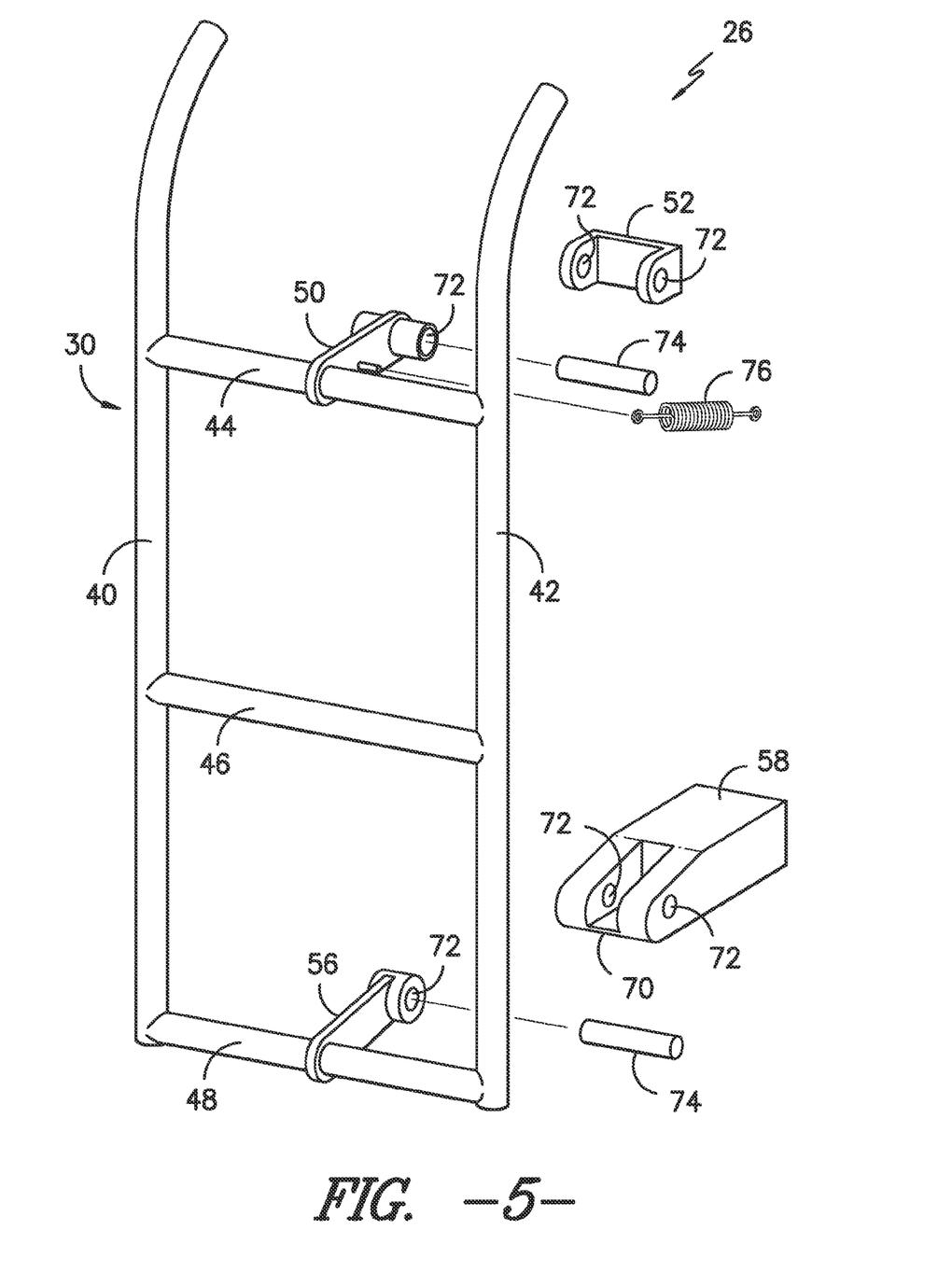
FIG. 5 illustrates an exploded view of various components of the ladder assembly shown in FIG. 1.

Referring now to FIGS. 2-5, various views of the embodiment of the ladder assembly 26 shown in FIG. 1 are illustrated in accordance with aspects of the present subject matter. Specifically, FIGS. 2 and 3 illustrate close-up, perspective views of the ladder assembly 26, particularly illustrating the ladder 30 of the ladder assembly 26 in a first, raised position (FIG. 2) and a second, lowered position (FIG. 3). Additionally, FIG. 4 illustrates a side view of the ladder assembly 26 shown in FIG. 3 and FIG. 5 illustrates an exploded view of various components of the ladder assembly 26 shown in FIGS. 1-4.

As particularly shown in FIG. 5, the ladder 30 of the ladder assembly 26 may generally include a first side rail 40 and a second side rail 42 disposed opposite the first side rail 40, with the first and second side rails 40, 42 extending generally parallel to one another. In addition, the ladder 30 may include a plurality of steps or rungs 44, 46, 48 extending between the first and second side rails 40, 42. For example, as shown in the illustrated embodiment, the ladder 30 includes three rungs extending between the side rails 40, 42 (e.g., a top rung 44, a middle rung 46 and a bottom rung 48). However, in other embodiments, the ladder 30 may include less than three rungs, such as two rungs, or more than the three rungs, such as four or more rungs, extending between the side rails 40, 42.

As is generally understood, the side rails 40, 42 may be configured as relatively straight structural members of the ladder 30 and generally extend vertically between the rungs 44, 46, 48. However, as shown in FIGS. 2-5, in one embodiment, a top portion of each side rail 40, 42 (e.g., the portion extending from the top rung 44) may be slightly arced or curved in the direction of the work vehicle 10. As such, the top portions of each side rail 40, 42 may form a handle-like shape that may assist the operator in gripping the side rails 40, 42 while climbing up the ladder 30.

As indicated above, in several embodiments, the ladder 30 may be configured to be pivotally supported on the work vehicle 10. For example, as shown in the illustrated embodiment, the ladder assembly 26 may include a first linkage 50 and a first support member 52, with the first linkage 50 being pivotally connected to the first support member 52 so as to define a first pivot point 54 (FIG. 4) between the first linkage 50 and the first support member 52. Similarly, the ladder assembly 26 may also include a second linkage 56 and a second support member 58, with the second linkage 56 being pivotally connected to the second support member 58 so as to define a second pivot point 60 (FIG. 4) between the second linkage 56 and the second support member 58. Accordingly, by rotating the linkages 50, 56 relative to the support members 52, 58 about the pivot points 54, 60, the ladder 30 may be pivoted up and down relative to fuel tank 30.

In such an embodiment, it should be appreciated that the first and second linkages 50, 56 may generally be coupled to and/or extend from the ladder 30 at any suitable location. For example, as shown in the illustrated embodiment, the first linkage 50 is coupled between the top rung 44 and the first support member 52 while the second linkage 56 is coupled between the bottom rung 48 and the second support member 58. However, in alternative embodiments, the first and second linkages 50, 56 may be configured to extend between any other suitable portion of the ladder 30 (e.g., a different rung or the side rails) and their respective support members 52, 58.

It should also be appreciated that the first and second support members 52, 58 may generally comprise any suitable structural components that are capable of pivotally supporting the ladder 30. For example, in several embodiments, one or both of the support members 52, 58 may comprise a pre-existing structural component(s) of the work vehicle 10, such as a pre-existing frame(s), support bracket(s), support platform(s) and/or any other suitable component(s) of the work vehicle 10. In such an embodiment, the support members 52, 58 may be modified, as necessary, to allow for the pivotal connection with the linkages 50, 56 to be achieved. Alternatively, one or both of the support members 52, 58 may be a newly added component(s) that allows for the ladder 30 to be pivotally supported on the work vehicle 10. In such an embodiment, the support members 52, 58 may be installed on the work vehicle 10, for instance, by rigidly coupling such support members 52, 58 to any suitable pre-existing component(s) of the work vehicle 10.

By pivotally supporting the ladder 30 on the work vehicle 10 at the first and second pivot points 54, 60, the ladder assembly 26 may form a four bar linkage allowing the ladder 30 to be pivoted as a single unit about the pivot points 54, 60 between a first, raised position and a second, lowered position. For example, as shown in FIG. 2, when in the raised position, the ladder 30 may be positioned directly adjacent to the fuel tank 32 with the bottom rung 48 of the ladder 30 being disposed above the bottom of the fuel tank 32, thereby stowing the ladder 30 out of the way and preventing it from contacting crops and/or any other objects passing under and/or along the side of the work vehicle 10 during operation. However, when the ladder 30 is desired to be used to gain access to the service platform 28, the ladder 30 may be pivoted downward and outwardly away from the fuel tank 32 to the lowered position. For example, as shown in FIGS. 3 and 4, the ladder 30 may be pivoted downward such that the bottom rung 48 of the ladder 30 is positioned relatively close to the ground (e.g., at a location below the bottom of the fuel tank 32), thereby allowing the operator to easily step-up onto the bottom rung 48. Moreover, as particularly shown in FIG. 4, the ladder 30 may be pivoted away from the fuel tank 32 when in the lowered position such that a clearance gap 62 is defined between the ladder 30 and the fuel tank 32. In such an embodiment, the length of the first and second linkages 50, 56 may be selected so that the clearance gap 62 defines a sufficient toe clearance for the operator to place his/her foot squarely on the rungs 44, 47, 48 while climbing up the ladder 30.

Additionally in several embodiments, at least a portion of the ladder 30 and/or other components of the ladder assembly 26 may be configured to be recessed into a portion of the fuel tank 32 when in the raised position. In such embodiments, the fuel tank 32 may be molded or otherwise modified so as to define one or more small, recessed features for receiving portions of the ladder 30 and/or other components of the ladder assembly 26. For example, as shown in FIG. 3, the fuel tank 32 may define one or more horizontally extending recessed channels 64 and/or one or more vertically extending recessed channels 66 configured to receive one or more of the rungs 44, 46, 48 and/or the side rails 40, 42 of the ladder 30, respectively. Additionally, as shown in FIG. 3, the fuel tank 32 may also define one or more vertically extending recessed channels 58 configured to receive a portion of the linkages 50, 53 when the ladder 30 is moved to the raised position.

Moreover, in one embodiment, one or both of the support members 52, 58 may be configured to define a positive, mechanical stop for the ladder 30 when it is being moved to between the raised and lowered positions, thereby limiting the range of motion of the ladder 30. For example, as shown in FIG. 4, a bottom portion 70 of the second support member 58 may be configured to extend beyond the location of the second pivot point 60. As such, when the ladder 30 is pivoted to the lowered position, the second linkage 56 may contact the bottom portion 70 of the second support member 58, thereby preventing the ladder from being pivoted any further downward.

It should be appreciated that the pivotal connection defined between the linkages 50, 56 and the support members 52, 58 may be achieved using any suitable rotational and/or pivotal attachment means known in the art. For example, as particularly shown in FIG. 5, the linkages 50, 56 and support members 52, 58 may define corresponding openings 72 configured to receive a bolt, pin and/or other suitable component 74 about which the linkages 50, 56 may be pivoted relative to the support members 52, 58. In such an embodiment, one or more suitable bushings and/or bearings may also be used to reduce friction and/or to otherwise enhance the pivotal connection defined between the linkages 50, 56 and the support members 52, 58. Of course, it should be appreciated that, in alternative embodiments, any other suitable rotational and/or pivotal attachment means may be used to pivotally connect the linkages 50, 56 to the support members 52, 58.

It should also be appreciated that, in an alternative embodiment, the ladder assembly 26 may only be pivotally supported on the work vehicle at a single pivot point. For example, a single linkage may extend from the ladder 30 (e.g., from the middle rung 46) and may be pivotally connected to a suitable support member. In such an embodiment, the entire ladder may be pivoted about the single pivot point between the raised and lowered positions.

Additionally, in one embodiment, one or more suitable biasing mechanisms 76 may be coupled to the first linkage 50 and/or the second linkage 56 at and/or adjacent to its respective pivot point 54, 60 to provide a biasing force against the linkage(s) 50, 56 in order to bias the ladder 30 towards the raised position and/or the lowered position. In one embodiment, the biasing mechanism(s) 76 may be configured to apply a biasing force against the linkage(s) 50, 56 in the direction of either the raised position or the lowered position depending on the position of the linkage(s) 50, 56 relative to horizontal. For example, as shown in the illustrated embodiment, the biasing mechanism(s) 76 may be coupled between the first linkage 50 and the first support member 52 such that, when the first linkage 50 is angled above horizontal, the biasing mechanism(s) 76 may exert a basing force against the linkage 50 that pulls the ladder 30 upward towards the raised position. However, when the first linkage 50 is angled below horizontal, the biasing mechanism(s) 76 may exert a basing force against the first linkage 50 that pulls the ladder 30 downward towards the lowered position.

It should be appreciated that the biasing mechanism(s) 76 may generally comprise any suitable mechanism(s) known in the art that is capable of providing a biasing force against the linkage(s) 50, 56. For example, as shown in the illustrated embodiment, the biasing mechanism(s) 76 may comprise a spring (e.g., an over-center spring) coupled between the first linkage 50 and the first support member 52.

It should also be appreciated that, although the present subject matter has been generally described herein with reference to the ladder assembly 26 being pivotally supported on the work vehicle 10 adjacent to the fuel tank 32, the ladder assembly 26 may be supported on the vehicle 10 adjacent to any other suitable vehicle component. In such an embodiment, such other vehicle component may, for example, include one or more of the recessed features 64, 66, 68 described above for recessing portions of the ladder assembly 26 into the component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A work vehicle comprising:
   a fuel tank comprising at least one recessed channel;
   a ladder assembly pivotally supported relative to the fuel tank, the ladder assembly comprising:
      a ladder including a first side rail, a second side rail, and first and second rungs extending between the first and second side rails, the ladder being supported on the work vehicle at a first pivot point and a second pivot point, the ladder further comprising a first linkage and a second linkage, the first linkage being coupled between the first rung and the first pivot point, the second linkage being coupled between the second rung and the second pivot point, wherein the ladder is configured to pivot about the first and second pivot points between a first position and a second position; and
      a biasing mechanism coupled to the first linkage or to the second linkage, wherein the biasing mechanism is configured to bias the ladder toward the first position when a respective linkage is above a horizontal orientation and toward the second position when the respective linkage is below the horizontal orientation, and the at least one recessed channel is configured to at least partially receive the first or second rung.

2. The work vehicle of claim 1, wherein the ladder assembly comprises a first support member and a second support member, the first pivot point is located between the first linkage and the first support member such that the first linkage is rotatable relative to the first support member about the first pivot point, and the second pivot point is located between the second linkage and the second support member such that the second linkage is rotatable relative to the second support member about the second pivot point.

3. The work vehicle of claim 2, wherein the first support member or the second support member is configured to block the ladder from being pivoted beyond the first position or the second position.

4. The work vehicle of claim 1, wherein the ladder is disposed adjacent to the fuel tank when the ladder is in the first position.

5. The work vehicle of claim 4, wherein the ladder is configured to be pivoted downward relative to the fuel tank when the ladder assembly is moved from the first position to the second position.

6. The work vehicle of claim 4, wherein the ladder is configured to be pivoted away from the fuel tank when the ladder assembly is moved from the first position to the second position such that a clearance gap is located between the ladder and the fuel tank.

7. A work vehicle comprising:
   a fuel tank;
   a ladder assembly pivotally supported relative to the fuel tank, the ladder assembly comprising:
   a ladder including a first side rail, a second side rail, and first and second rungs extending between the first and second side rails, wherein the ladder is supported relative to the fuel tank at a first pivot point and a second pivot point, the ladder comprises a first linkage and a second linkage, the first linkage is coupled between the first rung and the first pivot point, the second linkage is coupled between the second rung and the second pivot point, and the ladder is configured to pivot about the first and second pivot points relative to the fuel tank between a first position and a second position; and
   a biasing mechanism coupled to a respective linkage of the first linkage or the second linkage, wherein the biasing mechanism is configured to bias the ladder toward the first position when the respective linkage is above a horizontal orientation and toward the second position when the respective linkage is below the horizontal orientation,
   wherein the fuel tank comprises at least one recessed channel configured to receive at least a portion of the ladder.

8. The work vehicle of claim 7, wherein the ladder assembly comprises a first support member and a second support member, the first pivot point is located between the first linkage and the first support member such that the first linkage is rotatable relative to the first support member about the first pivot point, and the second pivot point is located between the second linkage and the second support member such that the second linkage is rotatable relative to the second support member about the second pivot point.

9. The work vehicle of claim 7, wherein the first support member or the second support member is configured to block the ladder from being pivoted beyond the first position or the second position.

10. The work vehicle of claim 7, wherein the ladder is disposed adjacent to the fuel tank when the ladder is in the first position.

11. The work vehicle of claim 7, wherein the at least a portion of the ladder assembly is configured to be received within the at least one recessed channel when the ladder is in the first position.

12. The work vehicle of claim 7, wherein the ladder is configured to be pivoted downward relative to the fuel tank when the ladder is moved from the first position to the second position.

13. The work vehicle of claim 7, wherein the ladder is configured to be pivoted away from the fuel tank when the ladder is moved from the first position to the second position such that a clearance gap is located between the ladder and the fuel tank.

14. The work vehicle of claim 7, wherein the portion of the ladder comprises a portion of a first or second rung of the ladder.

15. A work vehicle comprising:
   a fuel tank comprising at least one recessed channel;
   a ladder assembly pivotally supported relative to the fuel tank, the ladder assembly comprising:
   a ladder including a first side rail, a second side rail, and first and second rungs extending between the first and second side rails, wherein the ladder is supported relative to the fuel tank at a first pivot point and a second pivot point, the ladder comprises a first linkage and a second linkage, the first linkage is coupled between the first rung and the first pivot point, the second linkage and coupled between the second rung and the second pivot point, the ladder is configured to pivot about the first and second pivot points relative to the fuel tank between a first position and a second position, and the at least one recessed channel is configured to at least partially receive the first or second rung.

16. The work vehicle of claim 15, wherein the ladder assembly comprises a first support member and a second support member, the first pivot point is located between the first linkage and the first support member such that the first linkage is rotatable relative to the first support member about the first pivot point, and the second pivot point is located between the second linkage and the second support member such that the second linkage is rotatable relative to the second support member about the second pivot point, and at least one of the support members blocks rotation of the first or second linkage beyond the second position by contacting the first or second linkage when ladder is in the second position.

17. The work vehicle of claim 15, wherein the ladder is disposed adjacent to the fuel tank when the ladder is in the first position.

18. The work vehicle of claim 15, wherein the ladder assembly comprises a biasing mechanism coupled to a respective linkage of the first linkage or the second linkage, wherein the biasing mechanism is configured to bias the ladder toward the first position when the respective linkage is above a horizontal orientation and toward the second position when the respective linkage is below the horizontal orientation.

19. The work vehicle of claim 18, wherein the biasing mechanism comprises a spring.

* * * * *